Jan. 13, 1970   J. HOOGLAND   3,489,488
FOUR COMPONENT DOUBLE GAUSS TYPE PHOTOGRAPHIC OBJECTIVE
Filed Nov. 7, 1966
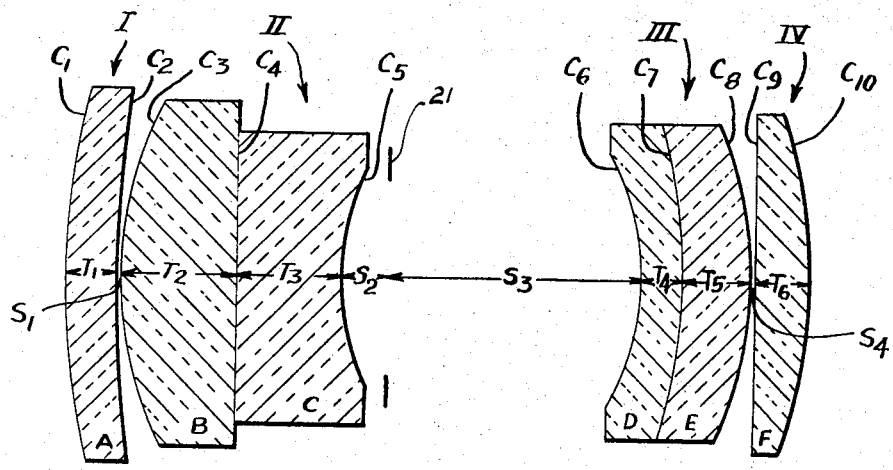
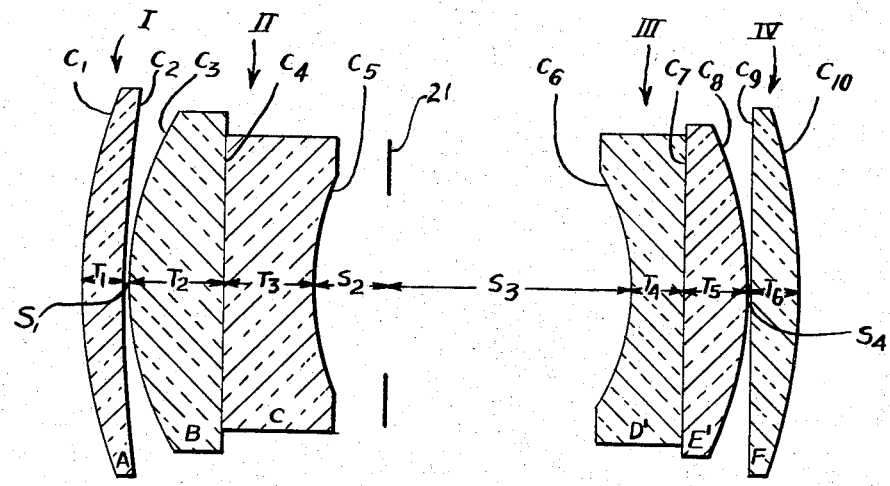
INVENTOR.
Jan Hoogland
BY
Irving M. Kriegsman
ATTORNEY.

United States Patent Office 3,489,488
Patented Jan. 13, 1970

3,489,488
FOUR COMPONENT DOUBLE GAUSS TYPE PHOTOGRAPHIC OBJECTIVE
Jan Hoogland, Wilton, Conn., assignor to The Perkin-Elmer Corporation, Norwalk, Conn., a corporation of New York
Filed Nov. 7, 1966, Ser. No. 592,440
Int. Cl. G02b 9/36
U.S. Cl. 350—222                       2 Claims

ABSTRACT OF THE DISCLOSURE

A four component, six element, double Gauss type optical objective in which the axial thickness of the second component is between .15 and .22 times the effective focal length and the front vertex distance is between 1.12 and 1.19 times the effective focal length.

---

The present invention relates to a photographic objective of the double Gauss type.

As is well known, the standard or norm of the double Gauss objective consists of four components of which the outer two are positive and the inner two are negative meniscus components concave toward a central air space.

It is an object of this invention to provide a new and novel four component six element double Gauss type photographic objective.

It is another object of this invention to provide a Gauss type photographic objective having a front vertex distance of less than 1.19 times the effective focal length.

It is still another object of this invention to provide a photographic objective that is simple in construction and which utilizes inexpensive materials which have relatively low indices of refraction.

It is yet still another object of this invention to provide a photographic objective of the double Gauss type having a relatively high aperture and a front vertex distance between 1.12 and 1.19 times the effective focal length.

It is another object of this invention to provide a four component six element double Gauss objective in which as many as five of the refracting surfaces are flat.

It is still another object of this invention to provide a photographic objective having a long focal length, a relative aperture of F/4 and covering a field of up to 30° with high resolution.

The above and other objects as well as many attendant advantages thereof are achieved by means of a photographic objective constructed in accordance with the invention.

The photographic objective of this invention is essentially a modified version of a four component six element type double Gauss objective and consists of a pair of single element outer components of positive power and a pair of cemented doublet meniscus shaped inner components of negative power. One feature of the invention involves making the axial thickness of the second component between .15 and .22 times the effective focal length. Another feature of this invention involves the form, curvatures and spacings of each of the components. Another feature of the invention involves decreasing the front vertex distance so that it is between 1.12 and 1.19 times the effective focal length. In one embodiment three of the twelve refracting surfaces are flat. In another embodiment five of the twelve refracting surfaces are flat.

A clearer concept of the scope and purpose of the invention along with other advantages and features thereof will be obtained from the following detailed description taken in conjunction with the drawings in which:

FIGURE 1 is an optical diagram of one embodiment of the invention; and

FIGURE 2 is an optical diagram of another embodiment of the invention.

Referring now to FIGURE 1, there is shown a four component, six element photographic objective of the double Gauss type.

The first component (I) is a positive meniscus element A with its concave surface facing a diaphragm member 21. The second component (II) is a cemented doublet consisting of a positive plano convex element B with its convex surface concave toward the diaphragm 21 and a negative plano concave element C with its concave surface concave toward the diaphragm 21. As can be seen, elements B and C are cemented at their plano surfaces. The third component (III) is also a cemented doublet of negative power consisting of a negative meniscus element D in which both concave surfaces are concave toward the diaphragm 21 and a positive meniscus element (E) in which both convex surfaces are concave toward the diaphragm 21. The diaphragm member 21 is located in the air space between the second and third components. The fourth component (IV) is a plano convex element F in which the convex surface is concave toward the diaphragm 21.

As is well known in the art, the curvature of a surface is equal to the reciprocal of its radius.

The following table, identified as Example I, shows the curvatures ($c$), thicknesses ($t$), spacing ($s$), refractive indices ($Nd$) and Abbe numbers ($v$) of an example of an objective constructed in accordance with the embodiment shown in FIGURE 1. In the table, the components are designated by Roman numerals and the elements by capital letters.

EXAMPLE I

Focal Length=1.000; Relative Aperature=F/4
Total Field of View=20°
Front Vertex Distance (F.V.D.)=1.1700
Back Focal Length (B.F.)=.5604

| Component | Lens | Curvature | Thickness or spacing | Refractive Index, $Nd$ | Abbe No., $v$ |
|---|---|---|---|---|---|
| I | A | $c_1=1.7433$ | $t_1=.0450$ | 1.62041 | 60.29 |
|   |   | $c_2=.5899$ | $s_1=.0020$ | Air | |
| II | B | $c_3=3.2451$ | $t_2=.0954$ | 1.62041 | 60.29 |
|    | C | $c_4=.0000$ | $t_3=.0850$ | 1.62004 | 36.10 |
|    |   | $c_5=4.9275$ | $s_2=.0393$ | Air | |
|    |   |             | $s_3=.2062$ | Air | |
| III | D | $c_6=-4.7600$ | $t_4=.0347$ | 1.62004 | 36.10 |
|     | E | $c_7=-2.2715$ | $t_5=.0550$ | 1.62041 | 60.29 |
|     |   | $c_8=-3.0594$ | $s_4=.0020$ | Air | |
| IV  | F | $c_9=.0000$ | $t_6=.0450$ | 1.62041 | 60.29 |
|     |   | $c_{10}=-2.3640$ | | | |

Referring now to FIGURE 2, there is shown another embodiment of the invention. In this embodiment components I through IV are similar in form to components I through IV of the FIGURE 1 embodiment. However, the negative meniscus element (D) and the positive meniscus element (E) in FIGURE 1 have been replaced in FIGURE 2 by a plano concave element (D') and a positive plano convex element (E'.) The concave surface of the plano concave element (D') and the convex surface of the plano convex element (E') are both concave toward the diaphragm 21.

The following table identified as Example II, shows the curvatures ($c$), thicknesses ($t$), spacings ($s$), refractive indices ($Nd$) and Abbe numbers ($v$) of an example of an objective constructed in accordance with the embodiment shown in FIGURE 2. In the table, the components are designated by Roman numerals and the elements by capital letters.

EXAMPLE II

Focal Length=1.000; Relative Aperture=F/4
Total Field of View=30°
Front Vertex Distance (F.V.D.)=1.1353
Back Focal Length (B.F.)=.5204

| Component | Lens | Curvature | Thickness or Spacing | Refractive Index, $Nd$ | Abbe No., $v$ |
|---|---|---|---|---|---|
| I | A | $c_1 = 1.9474$ | $t_1 = .0370$ | 1.62041 | 60.29 |
|   |   | $c_2 = .6907$ | $s_1 = .0020$ | Air |   |
| II | B | $c_3 = 3.3762$ | $t_2 = .0800$ | 1.62041 | 60.29 |
|   | C | $c_4 = .0000$ | $t_3 = .0785$ | 1.62004 | 36.10 |
|   |   | $c_5 = 4.7964$ | $s_2 = .0629$ | Air |   |
|   |   |   | $s_3 = .2107$ | Air |   |
| III | D | $c_6 = -4.9244$ | $t_4 = .0469$ | 1.60562 | 43.92 |
|   | E | $c_7 = .0000$ | $t_5 = .0528$ | 1.62280 | 56.88 |
|   |   | $c_8 = -3.0554$ | $s_4 = .0020$ | Air |   |
| IV | F | $c_9 = .0000$ | $t_6 = .0420$ | 1.62280 | 56.88 |
|   |   | $c_{10} = -2.1105$ |   |   |   |

Various other arrangements and modifications will be apparent to those skilled in the art.

What is claimed is:

1. A four component six element Gauss type photographic objective made substantially in accordance with the specifications set forth in the following table:

TABLE 1

Focal Length=1.000; Relative Aperature=F/4;
Total Field of View=20°
Front Vertex Distance (F.V.D.)=1.1700
Back Focal Length (B.F.)=.5604

| Component | Lens | Curvature | Thickness or spacing | Refractive Index, $Nd$ | Abbe No., $v$ |
|---|---|---|---|---|---|
| I | A | $c_1 = 1.7433$ | $t_1 = .0450$ | 1.62041 | 60.29 |
|   |   | $c_2 = .5899$ | $s_1 = .0020$ | Air |   |
| II | B | $c_3 = 3.2451$ | $t_2 = .0954$ | 1.62041 | 60.29 |
|   | C | $c_4 = .0000$ | $t_3 = .0850$ | 1.62004 | 36.10 |
|   |   | $c_5 = 4.9275$ | $s_2 = .0393$ | Air |   |
|   |   |   | $s_3 = .2062$ | Air |   |
| III | D | $c_6 = -4.7600$ | $t_4 = .0347$ | 1.62004 | 36.10 |
|   | E | $c_7 = -2.2715$ | $t_5 = .0550$ | 1.62041 | 60.29 |
|   |   | $c_8 = -3.0594$ | $s_4 = .0020$ | Air |   |
| IV | F | $c_9 = .0000$ | $t_6 = .0450$ | 1.62041 | 60.29 |
|   |   | $c_{10} = -2.3640$ |   |   |   | wherein the components are numbered in Roman numerals increasing in magnitude from front to rear, the lens elements are designated by capital letters, the curvatures of the surfaces are designated by $c$'s, the thicknesses of the elements designated by $t$'s, the air spaces designated by $s$'s, the refractive indices of the elements designated by $Nd$, and the Abbe numbers of the elements are designated by $v$.

2. A four component six element Gauss type photographic objective made substantially in accordance with the specifications set forth in the following table:

TABLE 2

Focal Length=1.000; Relative Aperture=F/4
Total Field of View=30°
Front Vertex Distance (F.V.D.)=1.1353
Back Focal Length (B.F.)=.5204

| Component | Lens | Curvature | Thickness or Spacing | Refractive Index, $Nd$ | Abbe No., $v$ |
|---|---|---|---|---|---|
| I | A | $c^1 = 1.9474$ | $t^1 = .0370$ | 1.62041 | 60.29 |
|   |   | $c^2 = .6907$ | $s^1 = .0020$ | Air |   |
| II | B | $c^3 = 3.3762$ | $t^2 = .0800$ | 1.62041 | 60.29 |
|   | C | $c^4 = .0000$ | $t^3 = .0785$ | 1.62004 | 36.10 |
|   |   | $c^5 = 4.7964$ | $s^2 = .0629$ | Air |   |
|   |   |   | $s^3 = .2107$ | Air |   |
| III | D | $c^6 = -4.9244$ | $t^4 = .0469$ | 1.60562 | 43.92 |
|   | E | $c^7 = .0000$ | $t^5 = .0528$ | 1.62280 | 56.88 |
|   |   | $c^8 = -3.0554$ | $s^4 = .0020$ | Air |   |
| IV | F | $c^9 = .0000$ | $t^6 = .0420$ | 1.62280 | 56.88 |
|   |   | $c^{10} = -2.1105$ |   |   |   | wherein the components are numbered in Roman numerals increasing in magnitude from front to rear, the lens elements are designated by capital letters, the curvatures of the surfaces are designated by $c$'s, the thicknesses of the element are designated by $t$'s, the air spaces are designated by $s$'s, the refractive indices of the elements are designated by $Nd$, and the Abbe numbers of the elements are designated by $v$.

References Cited

UNITED STATES PATENTS 2,532,751  12/1950  Baker _____ 350—222
2,734,422  2/1956  Brendel et al. _____ 350—222

FOREIGN PATENTS 157,040  1/1921  Great Britain.

JOHN K. CORBIN, Primary Examiner